United States Patent
Wanda et al.

(10) Patent No.: US 12,406,390 B2
(45) Date of Patent: Sep. 2, 2025

(54) INFORMATION PROCESSING DEVICE, INFORMATION PROCESSING SYSTEM, INFORMATION PROCESSING METHOD, AND RECORDING MEDIUM

(71) Applicant: CANON KABUSHIKI KAISHA, Tokyo (JP)

(72) Inventors: Koichiro Wanda, Kanagawa (JP); Masakazu Fujiki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 18/050,358

(22) Filed: Oct. 27, 2022

(65) Prior Publication Data

US 2023/0134912 A1 May 4, 2023

(30) Foreign Application Priority Data

Nov. 4, 2021 (JP) .................................. 2021-180560

(51) Int. Cl.
  *G06T 7/73* (2017.01)
  *G06V 10/60* (2022.01)
  *G06V 10/75* (2022.01)

(52) U.S. Cl.
  CPC ............... *G06T 7/73* (2017.01); *G06V 10/60* (2022.01); *G06V 10/757* (2022.01); *G06T 2207/30252* (2013.01)

(58) Field of Classification Search
  CPC . G06T 7/73; G06T 2207/30252; G06T 7/246; G06T 17/05; G06V 10/60;
  (Continued)

(56) References Cited

U.S. PATENT DOCUMENTS 7,834,893 B2    11/2010  Wanda
10,390,003 B1 *  8/2019  Liu ..................... G01C 21/206
(Continued)

FOREIGN PATENT DOCUMENTS

CN    110335319 A  * 10/2019  .......... G06K 9/6201
JP    2003255037 A  *  9/2003
(Continued)

OTHER PUBLICATIONS

Masone et al., "A Survey on Deep Visual Place Recognition," in IEEE Access, vol. 9, pp. 19516-19547, 2021, doi: 10.1109/ACCESS.2021.3054937. (Year: 2021).*
(Continued)

*Primary Examiner* — Emily C Terrell
*Assistant Examiner* — Julia Z. Yao
(74) *Attorney, Agent, or Firm* — VENABLE LLP

(57) ABSTRACT

In an information processing device processing map information of a surrounding environment of a vehicle, a sensor information acquiring unit acquires output information of a sensor performing measurement relating to a movement amount or the surrounding environment of the vehicle. An error generation amount calculating unit calculates an error generation amount in position information of an element configuring map information on the basis of the acquired information. An accumulative error evaluating unit evaluates an accumulation degree of the calculated error generation amount. A correction determining unit determines need for an accumulative error correcting process relating to map information on the basis of an evaluation result of the accumulative error. In accordance with an instruction from the correction determining unit, a notification device notifies a user of need for correction using loop closure.

6 Claims, 5 Drawing Sheets

(58) Field of Classification Search
CPC ......... G06V 10/757; G06V 30/18143; G06V 20/56; G01B 11/00; G01B 11/26
See application file for complete search history.

(56) References Cited

U.S. PATENT DOCUMENTS

| | | | |
|---|---|---|---|
| 11,185,977 B2 | 11/2021 | Kobayashi | |
| 11,774,983 B1* | 10/2023 | Zhang | G05D 1/0253 701/28 |
| 2010/0070078 A1 | 3/2010 | Kong | |
| 2013/0216098 A1* | 8/2013 | Hasegawa | G06T 7/579 901/1 |
| 2017/0168498 A1* | 6/2017 | Nakajima | G01C 21/3837 |
| 2017/0176997 A1* | 6/2017 | Narikawa | G05D 1/0088 |
| 2017/0178331 A1* | 6/2017 | Narikawa | G06T 7/74 |
| 2018/0364731 A1* | 12/2018 | Liu | G05D 1/0274 |
| 2020/0012877 A1* | 1/2020 | Kotake | G06T 7/73 |
| 2020/0310435 A1* | 10/2020 | Hasegawa | G05D 1/0272 |
| 2022/0073084 A1* | 3/2022 | Sakai | B62D 15/0285 |
| 2023/0030791 A1 | 2/2023 | Miyatani | |

FOREIGN PATENT DOCUMENTS

| | | | |
|---|---|---|---|
| JP | 2017-167601 A | | 9/2017 |
| JP | 2020013560 A | * | 1/2020 |
| JP | 2020095435 A | * | 6/2020 |
| JP | 68-23403 B2 | | 2/2021 |
| JP | 2021113760 A | * | 8/2021 |
| WO | 2021/65594 A1 | | 4/2021 |

OTHER PUBLICATIONS

Raul Mur-Artal, J.M.M.Montiel, J.D.Tardos, "ORB-SLAM: A Versatile and Accurate Monocular SLAM System", IEEE Transactions on Robotics, 2015.
U.S. Appl. No. 17/960,194, filed Oct. 5, 2022, by Numakami, Yukio.
U.S. Appl. No. 18/093,393, filed Jan. 5, 2023, by Miyakawa, Takumi.
Japanese Office Action dated May 20, 2025 during prosecution of related Japanese Application No. 2021-180560. (English-language machine translation included).

* cited by examiner

INFORMATION PROCESSING DEVICE, INFORMATION PROCESSING SYSTEM, INFORMATION PROCESSING METHOD, AND RECORDING MEDIUM

BACKGROUND OF THE INVENTION

Field of the Invention

The present invention relates to a position/posture measurement technology and a movement control technology for a vehicle.

Description of the Related Art

"Simultaneous Localization And Mapping" (hereinafter, referred to as SLAM) is a technology for estimating a self-position/posture and map information of a surrounding environment by moving sensors such as a camera and the like. In "Raul Mur-Artal, J. M. M. Montiel, J. D. Tardos, "ORB-SLAM: A Versatile and Accurate Monocular SLAM System", IEEE Transactions on Robotics, 2015", as a method for estimating map information with high accuracy, a technology called loop closure (hereinafter, also referred to as LC) has been disclosed. LC can reduce an accumulative error (cumulative error) relating to map information by recognizing a section having a loop shape (a closed path) on a movement path of a sensor and adding continuity of a map in a closed path to constraint conditions.

In addition, in U.S. Pat. No. 6,823,403, a technology enabling a camera included in a head mounting-type display to generate display content prompting an experienced person of mixed reality to move to be closer to a position and a posture at which LC can be performed has been disclosed.

In a conventional technology, there is a problem in that a position and a timing relating to execution of correction using LC for appropriately correcting an accumulative error cannot be perceived by a user during capturing of a moving image used for generating map information of SLAM. For this reason, an operation of generating map information with higher accuracy of which an accumulative error is corrected becomes complicated.

SUMMARY OF THE INVENTION

An object of the present invention is to further reduce complication of an operation of generating map information with high accuracy.

An information processing device according to an embodiment of the present invention includes: an acquisition unit configured to acquire information relating to a movement amount or a surrounding environment of a vehicle; a estimation unit configured to estimate an error generation amount in position information relating to map information of the surrounding environment using the information acquired by the acquisition unit; an evaluation unit configured to evaluate an accumulation degree of the error generation amount; and a determination unit configured to acquire an evaluation result of the accumulation degree acquired by the evaluation unit and determine a need for a correction process on an accumulative error for the map information, in which the determination unit outputs a determination result of the need for a correction process to a notification device or a control device performing movement control of the vehicle.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. In the embodiments, as an application example of an information processing device according to the present invention, an information processing system that performs movement control of a vehicle will be described. As an example of the vehicle, an automated guided vehicle is illustrated.

First Embodiment

In this embodiment, capturing images used for generating map information of visual SLAM is performed using an imaging device mounted in a vehicle. An information processing system according to this embodiment acquires measurement values of a sensor and estimates an error generation amount. The error generation amount is a value having a correlation with an error amount generated every time when map information is estimated and is a value relating to a movement amount of a vehicle. For map information of visual SLAM, update of the map information such as addition of a key frame according to movement of a vehicle is performed. Information including drift error is added to a position/posture of a key frame or a feature point. A feature point is a point that is uniquely determined on an image from a brightness gradient change in a corner, an edge, or the like inside an acquired image.

In this way, the information processing system performs a process of estimating information about an amount (a movement amount) having a correlation with a movement distance of a vehicle or a movement distance related to an error generation amount and evaluates an accumulative error (cumulative error) on the basis of the estimated error generation amount. By using the error generation amount, an accumulative value of drift error accumulated during generation of map information of SLAM is evaluated. In order to appropriately perform a correction process on the accumulated error, the information processing system performs a process of determining a need for correction using loop closure and notifying a user of a result of the determination.

Figure 1A:
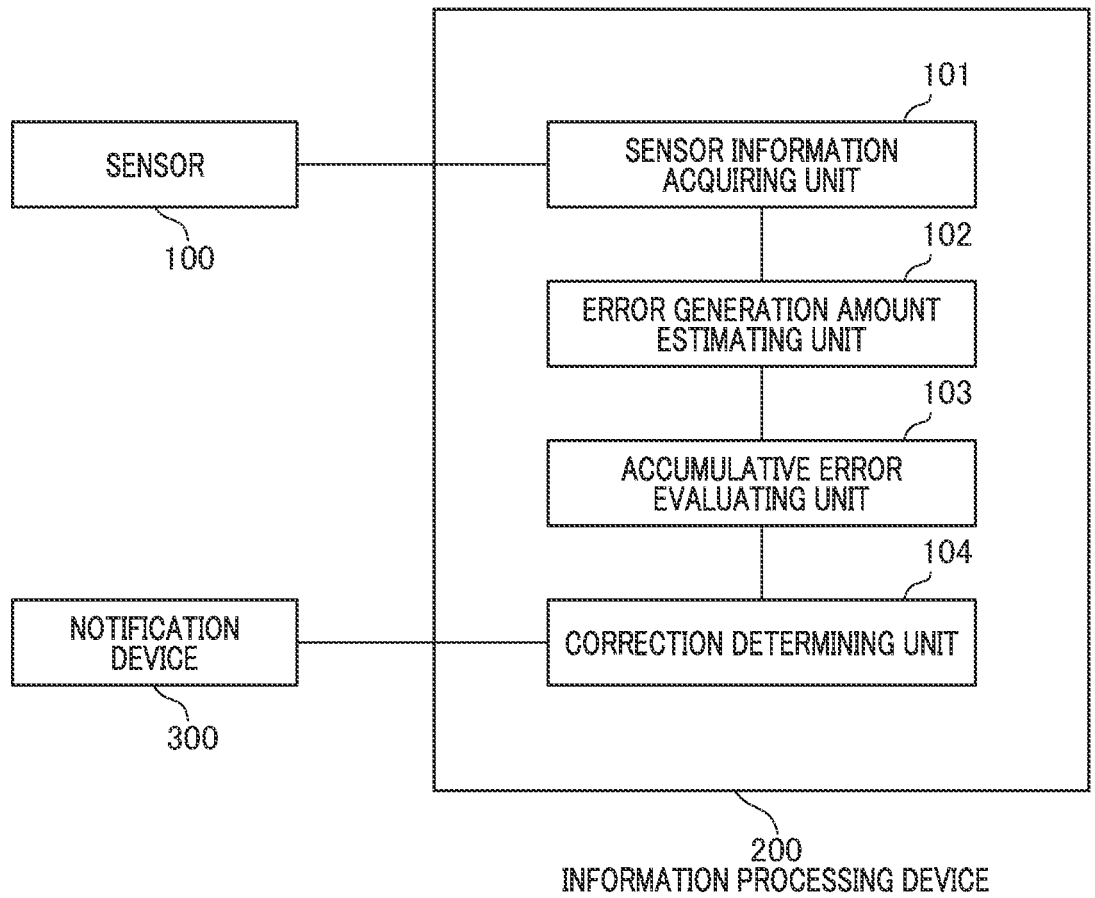
FIGS. 1A and 1B are diagrams illustrating configuration examples of information processing systems according to first and second embodiments.

FIG. 1A is a block diagram illustrating a configuration example of an information processing system according to this embodiment. The information processing system includes a sensor 100, an information processing device 200, and a notification device 300. Such constituent elements are mounted in an automated guided vehicle 1 that can perform capturing relating to an image used for generating map information of visual SLAM.

Figure 1B:
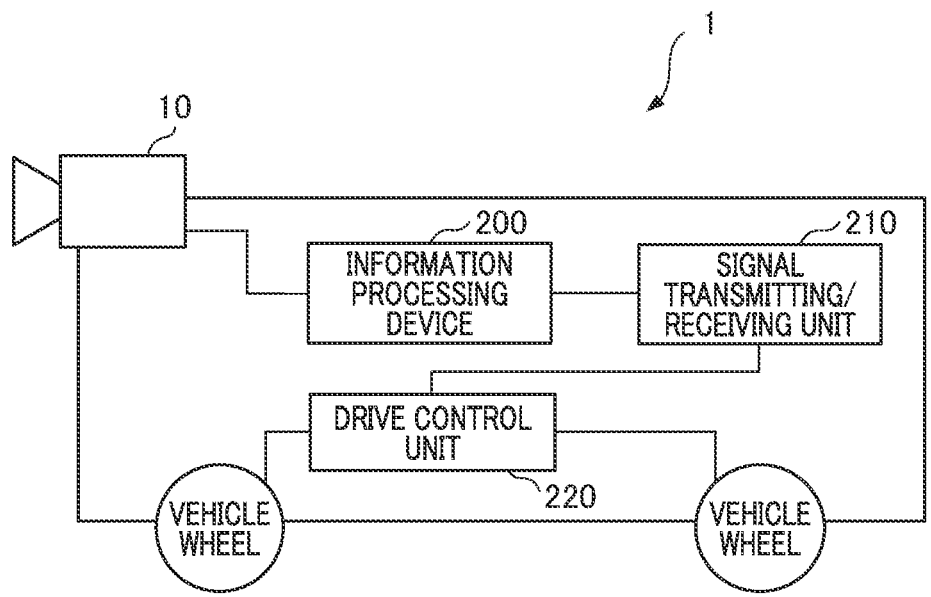

FIG. 1B is a diagram illustrating an overview of a configuration of the automated guided vehicle 1. The automated guided vehicle 1 includes an imaging device 10, an information processing device 200, a signal transmitting/receiving unit 210, and a drive control unit 220. Captured image information of a surrounding environment acquired by the imaging device 10 is processed by the information processing device 200. The information processing device 200 transmits a control signal based on captured image information to the drive control unit 220 through the signal transmitting/receiving unit 210. The drive control unit 220 performs drive control relating to a drive source of vehicle wheels in accordance with a received control signal.

A configuration of the information processing device 200 will be described with reference to FIGS. 1A and 1B. The sensor 100 acquires information (hereinafter, referred to as sensor information) relating to a movement amount of the automated guided vehicle 1. In this embodiment, a rotary encoder and a tachometer are used as the sensor 100. A rotation amount of vehicle wheels of the automated guided vehicle 1 is used as information relating to a movement amount. The notification device 300 notifies a user of need for correction using LC. For example, the notification device 300 has a voice output device such as a speaker. The automated guided vehicle 1 has an imaging device 10 such as a stereo camera mounted therein and acquires a plurality of viewpoint images used for generating map information while moving in accordance with a user operation. The plurality of viewpoint images are images that are captured at mutually-different viewpoints and are images having parallax.

The information processing device 200 acquires information relating to a movement amount from the sensor 100, evaluates an error accumulative amount, and performs a process of determining need for correction using LC. The information processing device 200 gives a notification to a user using the notification device 300 on the basis of a result of the determination. The information processing device 200 includes a sensor information acquiring unit 101, an error generation amount estimating unit 102, an accumulative error evaluating unit 103, and a correction determining unit 104.

The sensor information acquiring unit (hereinafter, referred to as an acquisition unit) 101 acquires sensor information from the sensor 100 and outputs the acquired sensor information to the error generation amount estimating unit 102. The error generation amount estimating unit (hereinafter, referred to as a estimation unit) 102 estimates and calculates an error generation amount using the acquired sensor information. The accumulative error evaluating unit (hereinafter, referred to as an evaluation unit) 103 acquires the error generation amount estimated by the estimation unit 102 and evaluates a degree of accumulation of error on the basis of the error generation amount.

The correction determining unit 104 determines need for a correction process for accumulative error using LC on the basis of a result of the evaluation of the accumulative error acquired by the evaluation unit 103. Information of the result of the determination acquired by the correction determining unit 104 is transmitted to the notification device 300. The notification device 300 notifies a user of need for correction using LC on the basis of the result of the determination.

More specifically, in the sensor 100, the rotary encoder outputs a pulse train in accordance with a rotation displacement amount of a shaft of vehicle wheels included in the automated guided vehicle 1, and the tachometer converts the pulse train into a rotation angle by counting the pulse trains. The sensor 100 regularly transmits a signal of a rotation amount to the acquisition unit 101. The acquisition unit 101 outputs information of the rotation amount to the estimation unit 102. The estimation unit 102 outputs information of the error generation amount to the evaluation unit 103. In this embodiment, a rotation amount is used as the error generation amount. The evaluation unit 103 estimates and evaluates a degree of accumulative error and transmits the degree of the accumulative error to the correction determining unit 104. The correction determining unit 104 outputs a result of the determination of the need for correction using LC based on the degree of the accumulative error to the notification device 300.

Figure 2:
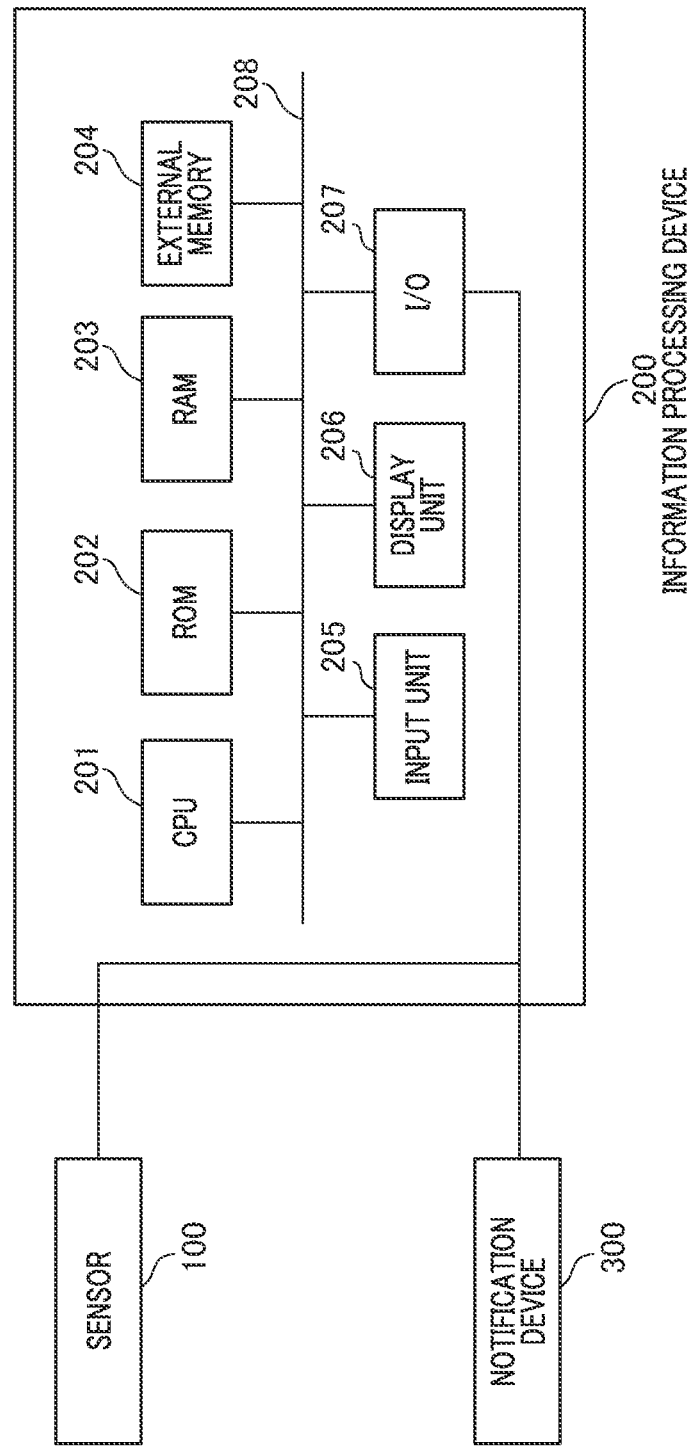
FIG. 2 is a diagram illustrating a hardware configuration example according to the first and second embodiments.

FIG. 2 is a block diagram illustrating an example of the hardware configuration of the information processing device 200. The information processing device 200 includes a central processing unit (CPU) 201 and controls various devices connected using a system bus 208. A read only memory (ROM) 202 stores a basic input output system (BIOS) program and a boot program used by the information processing device 200. A random access memory (RAM) 203 is used as a main storage device of the CPU 201. An external memory 204 stores programs and data processed by the information processing device 200.

An input unit 205 has input devices for performing an operation and an information input such as a keyboard, a pointing device, a robot controller, and a button. A display unit 206 displays a result of arithmetic processing of the information processing device 200 in accordance with a command of the CPU 201. The display unit 206 has display devices such as a liquid crystal display device, a projector, and an LED indicator.

An I/O 207 is a communication interface unit and performs information communication with an external device via a network or the like. The I/O 207 can perform Ethernet (registered trademark), a universal serial bus (USB), serial communication, wireless communication, and the like, and a type of communication may be arbitrary. In the information processing device 200, measurement values of sensors and data relating to measurement can be acquired through the I/O 207.

Figure 3:
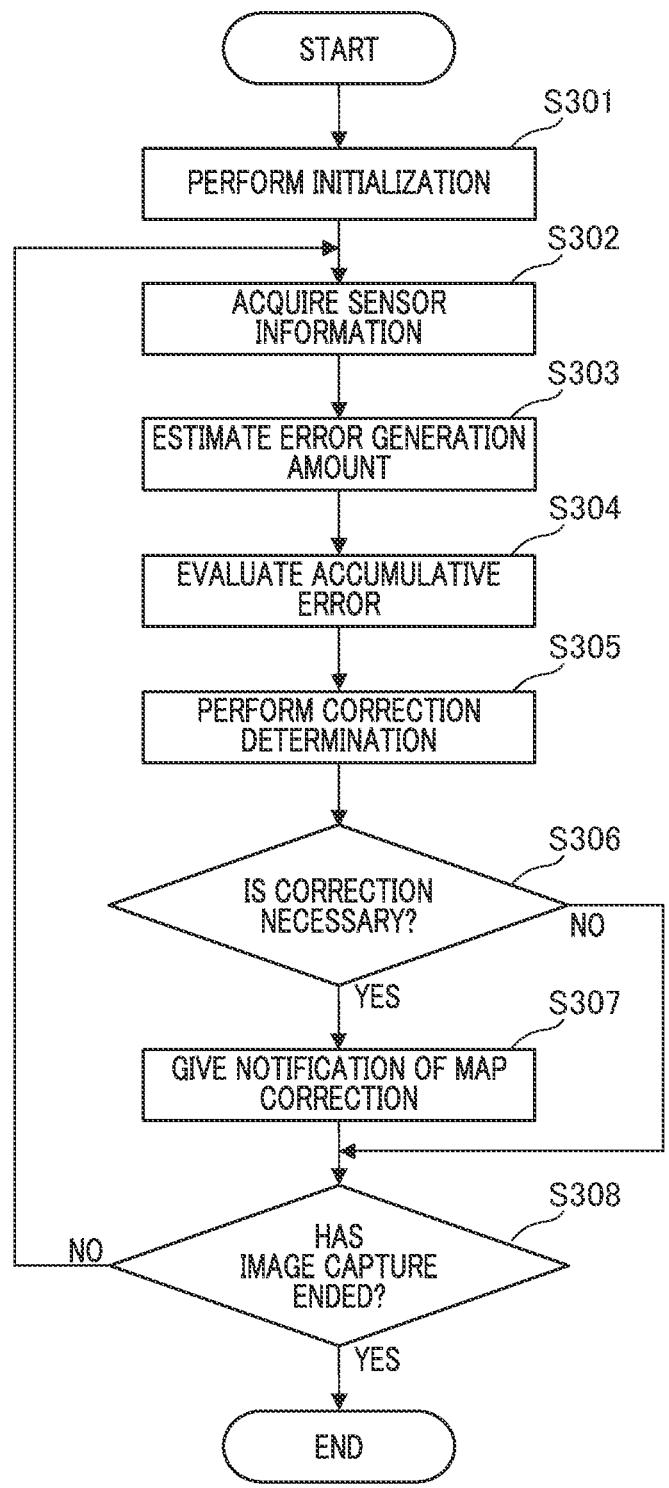
FIG. 3 is a flowchart illustrating processes according to the first and second embodiments.

Details of a process performed by the information processing device 200 will be described with reference to FIG. 3. FIG. 3 is a flowchart illustrating a flow of the process according to this embodiment, and the following processes are realized by the CPU 201 executing a program.

When capturing for map information starts, in S301, the acquisition unit 101, the estimation unit 102, the evaluation unit 103, and the correction determining unit 104 read setting values and parameters stored in the ROM 202. An initialization process for a memory storing the sensor information, the error generation amount, the evaluation value of accumulative error, and the like that have been acquired is performed. In addition, the acquisition unit 101 records an initial value of the rotation acquired by the sensor 100. Thereafter, since a difference from the rotation amount received from the sensor 100 for every unit time is acquired, the rotation amount acquired in S301 is stored as an initial value for conversion into a rotation amount from a start time point of image acquisition used for generating map information. In addition, the evaluation unit 103 initializes the value of an accumulative error amount accompanying an increase in the error generation amount to zero. The sensor is an imaging device such as a stereo camera. Three-dimensional map information of the vehicle peripheral environment is created based on image information imaged by the imaging device. The three-dimensional map information is, for example, a set of map elements. A map element is generated based on position/posture information of the imaging device when an image is captured, which is estimated from an image captured by the imaging device mounted on the vehicle, and three-dimensional position information of feature points included in the image. The three-dimensional map information is generated based on a plurality of map elements generated by the imaging device that captures images at a plurality of different positions/postures. The map element is also referred to as a "keyframe".

In S302, the acquisition unit 101 acquires a value of a rotation amount for every predetermined time (referred to as T) as sensor information from the sensor 100. The value of T can be arbitrarily set. The acquisition unit 101 calculates a difference between the acquired rotation amount and a rotation amount at the time of acquisition of the previous time. As sensor information immediately after initialization, the initial value of the rotation amount of the sensor 100 that is stored in S301 is used. The acquisition unit 101 transmits a signal of a rotation amount per unit time that has been calculated to the estimation unit 102.

In S303, the estimation unit 102 estimates an error generation amount on the basis of sensor information included in the signal received from the acquisition unit 101. More specifically, an error generation amount per unit time is estimated from the rotation amount per unit time acquired from the acquisition unit 101. The evaluation unit 103 estimates a total sum of rotation amounts from a start point of start of acquisition of an image used for generating map information of visual SLAM as an accumulative error generation amount. The estimation of accumulative error generation amount is performed to a specific map element.

In S304, the evaluation unit 103 evaluates a degree of accumulative error on the basis of the accumulative error generation amount estimated in S303. An accumulative error generation amount will be denoted by M, an accumulative error degree coefficient for each piece of sensor information will be denoted by Cm, and an accumulative error degree will be denoted by D. As an example of an evaluation equation of the accumulative error degree D, the following Equation (1) can be used.

$$D = Cm \times M \quad \text{Equation (1)}$$

If sensor information represents a rotation amount, the accumulative error degree coefficient Cm is a value representing a degree of accumulative error for a rotation amount. The evaluation unit 103 transmits a value of the accumulative error degree D that has been calculated to the correction determining unit 104.

In S305, the correction determining unit 104 performs a process of determining need for a correction process for accumulative error on the basis of the accumulative error evaluated in S304. It is determined whether or not the accumulative error degree acquired from the evaluation unit 103 is an accumulative error degree for which correction using loop closure needs to be performed. More specifically, the value of the accumulative error degree D is compared with a threshold. This threshold is a threshold of an accumulative degree for which an error causing an obstacle for operating map information is regarded to have been accumulated. If the acquired value of the accumulative error degree D exceeds the threshold, the correction determining unit 104 determines that correction using LC needs to be performed. If so, need for correction is determined to be present in S306, and the process proceeds to the process of S307. On the other hand, if the acquired value of the accumulative error degree D is equal to or smaller than the threshold, the correction determining unit 104 determines that there is no need for correction. In such a case, need for correction is determined to be absent in S306, and the process proceeds to the process of S308. In addition, the process of determining need for accumulative error correction continues every time when sensor information is acquired.

In S307, the correction determining unit 104 instructs the notification device 300 to give a notification (a map correction notification, first information) prompting correction using LC. The notification device 300 notifies a user of need for correction using LC. Vocal sound prompting correction using LC is output from a speaker mounted in the automated guided vehicle 1 to a user who is moving by operating the automated guided vehicle 1. The user who has heard the notification voice according to the notification device 300 performs an operation of turning the automated guided vehicle 1 such that correction using LC can be performed. In accordance with this, image capturing is able to be performed using the automated guided vehicle 1 that can perform correction using LC at a position and a timing that are appropriate for correcting accumulative error. After the process of S307, the process proceeds to the process of S308. As a component requirement, the determination unit is not essential, and when the estimated accumulative error exceeds a threshold, the first information related to the re-arrival of the vehicle to the vicinity of the point where the vehicle has already passed can be output. When the vehicle moves based on the first information, the position/posture information of the imaging device, which is included in the map element corresponding to the vicinity of the point where the vehicle has passed, is corrected.

In S308, the CPU 201 performs a process of determining presence/absence of an image capturing end instruction input from a user through the input unit 205. If it is determined that there is no image capturing end instruction input in S308, the process continues by returning to S302. On the other hand, if it is determined that there is an image capturing end instruction input in S308, a series of processes ends.

According to this embodiment, a position and a timing relating to appropriate loop closure based on an evaluation of accumulative error can be perceived by a user, and complication of an operation of generating high-accuracy map information can be reduced.

Next, a modified example (a first modified example) of the first embodiment will be described.

First Modified Example 1

In the first embodiment, an example in which, as a value having a correlation with a movement amount during generation of map information, a rotation amount of vehicle wheels of the automated guided vehicle 1 is used as an error generation amount has been described. In this modified example, as a value having a correlation with a movement amount during generation of map information, a measured value of a movement distance of the automated guided vehicle 1 is used.

In measurement of the movement distance of the automated guided vehicle 1, there are a method of calculating a traveling distance from a rotation amount and a radius of the vehicle wheels and a method of providing a measurement unit that measures a movement distance. For example, a movement distance can be measured by estimating a position of the automated guided vehicle 1 during generation of map information that is shown in an image using the image of a birds' eye view camera. In addition, in a case of an outdoor place, position information may be acquired using a global positioning system (GPS), and a movement distance be measured using the position information of the automated guided vehicle 1. In addition, there is a method of measuring a movement distance using image processing such as self-position estimation at the time of generating map information of visual SLAM.

First Modified Example 2

In this modified example, instead of using a rotation amount of sensor information as an error generation amount, a value acquired by normalizing an output of the sensor 100 as an error generation amount is used. By using accumulative error evaluated on the basis of a normalized error generation amount, a more accurate determination process relating to need for correcting accumulative error can be performed.

First Modified Example 3

In the first embodiment, an example in which need for correction using LC is notified to a user using a voice output device mounted in the automated guided vehicle 1 has been described. In the notification device 300, any unit may be used as long as need for correction using LC can be notified to a user.

In this modified example, by installing a warning lamp in the automated guided vehicle 1 as the notification device 300 and turning on the warning lamp, need for correction using LC is notified to the user. Alternatively, a configuration in which need for correction using LC is notified to a user through display of characters and an image using a display unit such as a display may be employed.

In addition, in this modified example, the automated guided vehicle 1 includes a communication device, and a communication terminal device other than the communication device is used as the notification device 300. For example, a tablet used for an operation of the automated guided vehicle 1, a personal computer that can perform wireless communication, or the like may be used as the notification device 300.

Second Embodiment

Next, a second embodiment of the present invention will be described. In this embodiment, a process of determining need for correction of accumulative error using a movement distance derived from an image acquired by an imaging device 10 as an example of a measured value relating to a movement amount of an automated guided vehicle 1 and notifying a user of a result thereof will be described.

An information processing system according to this embodiment performs correction determination by evaluating a degree of accumulative error with higher accuracy in consideration of accuracy reduction factors having influence on a degree of positional error of map elements. In self-position estimation of visual SLAM, a process of calculating position/posture of three-dimensional coordinates using feature points detected from a key frame image that is one of the map elements. A process of calculating self-position/ posture is performed by checking coincidence between feature points of the key frame image and a plurality of feature points included in an acquired image at the time of self-position estimation. A positional deviation between feature points is an error factor, and if a sufficient number of feature points cannot be detected, there is a possibility of causing reduction of accuracy of map information of visual SLAM.

In this embodiment, a process of evaluating accumulative error by considering a small number of feature points detected in a captured image added as a key frame image as an accuracy reduction factor will be described. Although the configuration of the information processing system according to this embodiment is similar to the configuration described with reference to FIG. 1, the sensor 100 according to this embodiment is the imaging device 10 mounted in the automated guided vehicle 1. Details of items that have been described in the first embodiment will be omitted, and mainly, differences from the first embodiment will be described. Such omissions of description are similarly performed for embodiments and modified examples to be described below.

A process performed by the information processing device 200 according to this embodiment will be described with reference to FIG. 3. When image capturing for map information starts, each unit of the information processing device 200 performs an initialization process in S301, and an acquisition unit 101 performs initialization of the imaging device 10 and preparation of acquisition of a captured image. In addition, a estimation unit 102 sets the value of the movement distance to zero.

In S302, the acquisition unit 101 acquires sensor information from the imaging device 10. As the sensor information, an image and setting information relating to image capturing are acquired. The acquisition unit 101 outputs the image and the setting information relating to image capturing that have been acquired to the estimation unit 102.

In S303, the estimation unit 102 calculates a movement distance for image acquisition of each time on the basis of the image and the setting information relating to image capturing that have been acquired as an error generation amount. By using a method similar to visual SLAM, a current self-position is estimated, and a process of estimating a movement distance from a difference from the self-position in an image acquired in the previous time.

In S303, a method for estimating a movement distance may be any method as long as the movement distance of a vehicle can be estimated. In this embodiment, similar to self-position estimation of visual SLAM, feature points are extracted from features of the inside of the acquired image. A process of estimating self-position/posture on the basis of extracted feature points and recording the estimated self-position/posture as information of a three-dimensional coordinate system is performed. A difference of the self-position/posture information is estimated each time an image is acquired.

As an example of information relating to the position/ posture, three parameters representing a position of the imaging device 10 or the automated guided vehicle 1 at the time of starting generation of map information and three parameters representing a posture of the imaging device 10 are used. The three parameters representing a position are a set of (X, Y, Z) in a three-dimensional coordinate system. The three parameters representing a posture are a set of parameters (Roll, Pitch, Yaw) of rotation angles around coordinate axes of the three-dimensional coordinate system as center axes.

The estimation unit 102 estimates the number of feature points as map accuracy information relating to an accuracy reduction factor of self-position estimation of SLAM. Similar to that at the time of generation of map information of visual SLAM, at a timing at which a key frame is added for every predetermined movement distance, detection and a counting process of feature points of an acquired image are performed. The estimation unit 102 estimates a ratio of the number of feature points used for estimating a self-position with respect to a predetermined maximum value. A ranking process according to the ratio of the number of feature points with respect to the maximum value is performed. For example, in the ranking process, a value corresponding to each of "GOOD" and "WEAK" is determined. If a state in which the ratio of the number of feature points with respect to the maximum value is equal to or higher than a predetermined threshold (a high accuracy state) is formed, ranking of "GOOD" is performed. In addition, if the number of feature points is slightly small, and a self-position can be estimated, ranking of "WEAK" is performed. In this embodiment, ranking information is used as map accuracy information.

In S304, the evaluation unit 103 evaluates a degree of accumulative error using the error generation amount and the map accuracy information. In addition to the accumulative error generation amount M and the accumulative error degree coefficient Cm for each piece of sensor information, an accuracy reduction coefficient will be denoted by DA. As an example of an evaluation equation of the accumulative error degree D, the following Equation (2) can be used.

$$D = Cm \times M \times DA \quad \text{Equation (2)}$$

Since the sensor information according to this embodiment is a movement distance of a vehicle, the accumulative error degree coefficient Cm is a value representing a degree of accumulative error relating to a movement distance. In addition, the accuracy reduction coefficient DA is a coefficient representing an accuracy reduction relating to a ratio of the number of valid feature points detected within a movement distance.

For example, a case in which a result of ranking of feature points detected in a key frame of map accuracy information is "GOOD" in frames of a number equal to or larger than a predetermined threshold will be assumed. In such a case, the number of detected feature points is sufficient, and thus the accuracy reduction coefficient DA is set to DA=1. In addition, a case in which the number of frames of a result of ranking of feature points is "GOOD" is equal to or smaller than the predetermined threshold, and a result of ranking of "WEAK" is many within a movement distance will be assumed. In such a case, the accumulative error increases, and thus the accuracy reduction coefficient DA is set to DA=2. Such coefficients are examples in embodiments, and arbitrary coefficients can be used in an application of the present invention.

In S304, the evaluation unit 103 outputs information including information relating to an accumulative error degree and an error generation amount and sensor information as accumulative error evaluation information to the correction determining unit 104. In S305, the correction determining unit 104 performs a process of determining need for correcting accumulative error. Then, processes of S306 to S308 are performed.

In this embodiment, in consideration of accuracy reduction factors of map information, determination relating to performing of a correction process (correction determination) by evaluating a degree of accumulative error with higher accuracy can be performed using map accuracy information.

Next, a modified example (a second modified example) of the second embodiment will be described.

Second Modified Example 1

In the second embodiment, although ranking information of the number of feature points is used as map accuracy information on the premise of stable acquisition of an image, there may be cases in which a good captured image cannot be acquired depending on surrounding environments. For example, there is a case in which an amount of noise of a captured image is too large, a case in which a captured image is too bright, or a case in which a captured image is too dark. Feature points detected from an image acquired in such a case have low reproducibility, and thus it becomes a factor for reducing accuracy at the time of using map information.

In this modified example, the estimation unit 102 performs a ranking process of an image acquisition status relating to map accuracy information and, similar to the ranking information of the number of feature points, uses the information for evaluating accumulative error or uses both types of information. For example, as ranking information of an image acquisition status, values respectively corresponding to "NOISELESS" and "NOISY" are used. If the ratio of the number of pixels of random noise in an image is equal to or lower than a predetermined threshold, ranking of "NOISELESS" is performed. On the other hand, if the ratio of the number of pixels of random noise in an image is higher than a predetermined threshold, ranking of "NOISY" is performed.

In addition, in this modified example, by estimating an average brightness value of an image and comparing the average brightness value with a threshold of a lower limit or an upper limit, a ranking process is performed. For example, if the average brightness value of the image is equal to or smaller than the threshold of the lower limit, ranking of "DARK" is performed. On the other hand, if the average brightness value of the image is equal to or larger than the threshold of the upper limit, ranking of "LIGHT" is performed. In addition, if the average brightness value of the image is larger than the threshold of the lower limit and smaller than the threshold of the upper limit, ranking of "NORMAL" is performed.

According to this modified example, by evaluating a degree of accumulative error with higher accuracy using various kinds of ranking information for evaluating accumulative error, correction determination can be performed.

Second Modified Example 2

In the second embodiment, an example in which map accuracy information is used without considering a difference in a captured image and an image acquired according to an image capture setting of a camera has been described. In this modified example, information representing differences in a captured image or an image capture setting of a camera is included in map accuracy information.

Generally, if map information is generated using a high-resolution image, the accuracy becomes high. In this modified example, the estimation unit 102 performs a ranking process for resolution of a captured image and determines ranks such as "High", "Middle", and "Low". Accumulative error is evaluated using a coefficient corresponding to the determined rank.

In addition, in this modified example, the estimation unit 102 acquires image capture setting information of a camera relating to the quality of a captured image, performs a ranking process, and uses ranking information for map accuracy information. For example, if an auto exposure (AE) function is included in a camera, ranking of "HIGH QUALITY" is performed. If the AE function is not included in a camera, raking of "LOW QUALITY" is performed. A coefficient corresponding to each rank is assigned and is used for map accuracy information.

According to this modified example, by including information representing differences in a captured image and an image capture setting of an imaging device in the map accuracy information, correction determination can be performed by evaluating a degree of accumulative error with higher accuracy.

Second Modified Example 3

In the second embodiment, although an example in which the number of feature points of an acquired image added as a key frame is used for map accuracy information has been described, the map accuracy information is not limited to the number of feature points. In this modified example, distance information between a position of an object and an image capture position (a position of the imaging device) corresponding to feature points in a detected image is used as map accuracy information. The estimation of this distance information is performed by the estimation unit 102 or a distance information estimating unit (not illustrated).

Generally, out of a case in which a position of an object corresponding to a feature point in an acquired image is close to an image capture position and a case in which the position is far from the image capture position, in the case in which the position is close to the image capture position, self-position estimation of visual SLAM can be performed with higher accuracy. In this modified example, a process of estimating a distance between the imaging device and an object in an actual space that corresponds to a feature point is performed. The evaluation unit 103 performs a process of adjusting a coefficient such that a value of an accumulative error degree becomes larger as the number of feature points for which the distance is longer than a predetermined threshold increases and thus can evaluate accumulative error more accurately.

According to this modified example, correction determination can be performed by evaluating a degree of accumulative error with higher accuracy using distance information between a position of an object corresponding to a feature point in an image and an image capture position.

Second Modified Example 4

In this modified example, by using not a discrete value in a ranking process relating to map accuracy information but a value that becomes a reference for a ranking process, an error accumulative amount is estimated. For example, by using a reciprocal of a sum of the numbers of feature points as an error generation amount, a process of evaluating an accumulative error degree is performed.

According to this modified example, by evaluating a degree of accumulative error with higher accuracy using the value that becomes a reference for the ranking process relating to the map accuracy information, correction determination can be performed.

Second Modified Example 5

If a vibration is added to the sensor 100, detection accuracy of feature points in an image is lowered, and accumulative error relating to the positions/postures of feature points increases. Thus, in this modified example, an amplitude of a vibration is estimated by mounting a vibration system in the sensor 100 or the automated guided vehicle 1 as a deviation detecting unit. The evaluation unit 103 evaluates that map information generation accuracy is lowered as a sum of amplitudes in a predetermined time interval becomes larger.

In addition, if an illuminance change is remarkable, tracking accuracy of feature points in an image is lowered, and accumulative error in the number of feature points that can be tracked and positions/postures of feature points increases. Thus, in this modified example, an illuminance meter is mounted near the sensor 100 included in the automated guided vehicle 1, and magnitude of an illuminance change is estimated. The evaluation unit 103 evaluates that map information generation accuracy is lowered as a sum of magnitudes of illuminance changes in a predetermined time interval becomes larger. In addition, in an environment in which external light is incident, an illuminance change according to a difference in time occurs, and thus the evaluation unit 103 evaluates that the map information generation accuracy is low in such an environment.

According to this modified example, by evaluating a degree of accumulative error with higher accuracy with considering an influence of a vibration on a sensor and influences of status changes in a surrounding environment (an illuminance change, presence/absence of external light, a temperature change, a humidity change, and the like), correction determination can be performed.

Third embodiment

A third embodiment of the present invention will be described with reference to FIGS. 4 and 5. In the embodiments described above, an embodiment in which a notification prompting correction using loop closure is given to a user on the basis of a result of correction determination has been described. In this embodiment, an example in which control of changing a position or a posture of the automated guided vehicle 1 is performed such that correction using LC is performed during generation of map information on the basis of a result of the correction determination will be described. Generation of map information is performed by a map information generating unit included in the information processing device 200 using a known method.

Figure 4:
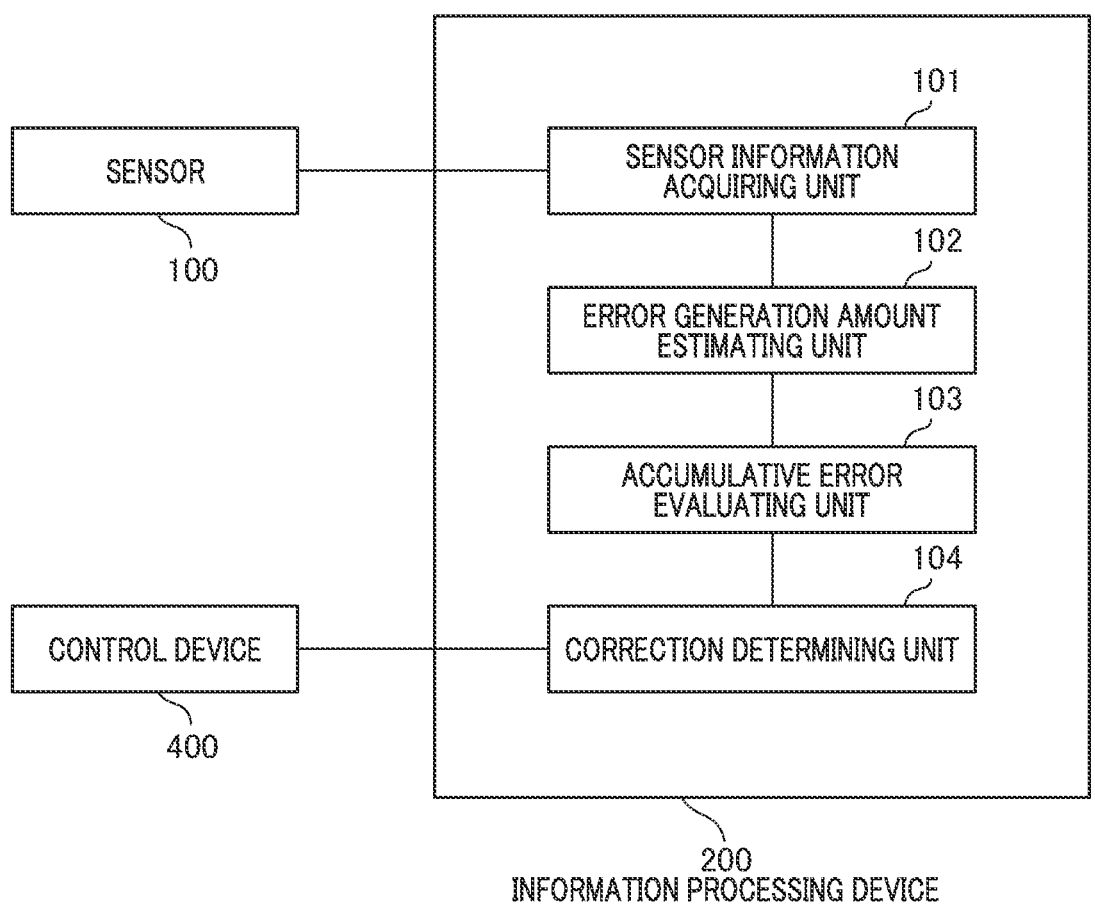
FIG. 4 is a diagram illustrating a configuration example of an information processing system according to a third embodiment.

FIG. 4 is a block diagram illustrating an example of the hardware configuration of the information processing device 200 according to this embodiment. A difference from that illustrated in FIG. 2 is in that a control device 400 is provided in place of the notification device 300. The control device 400 performs movement control of an automated guided vehicle 1.

Figure 5:
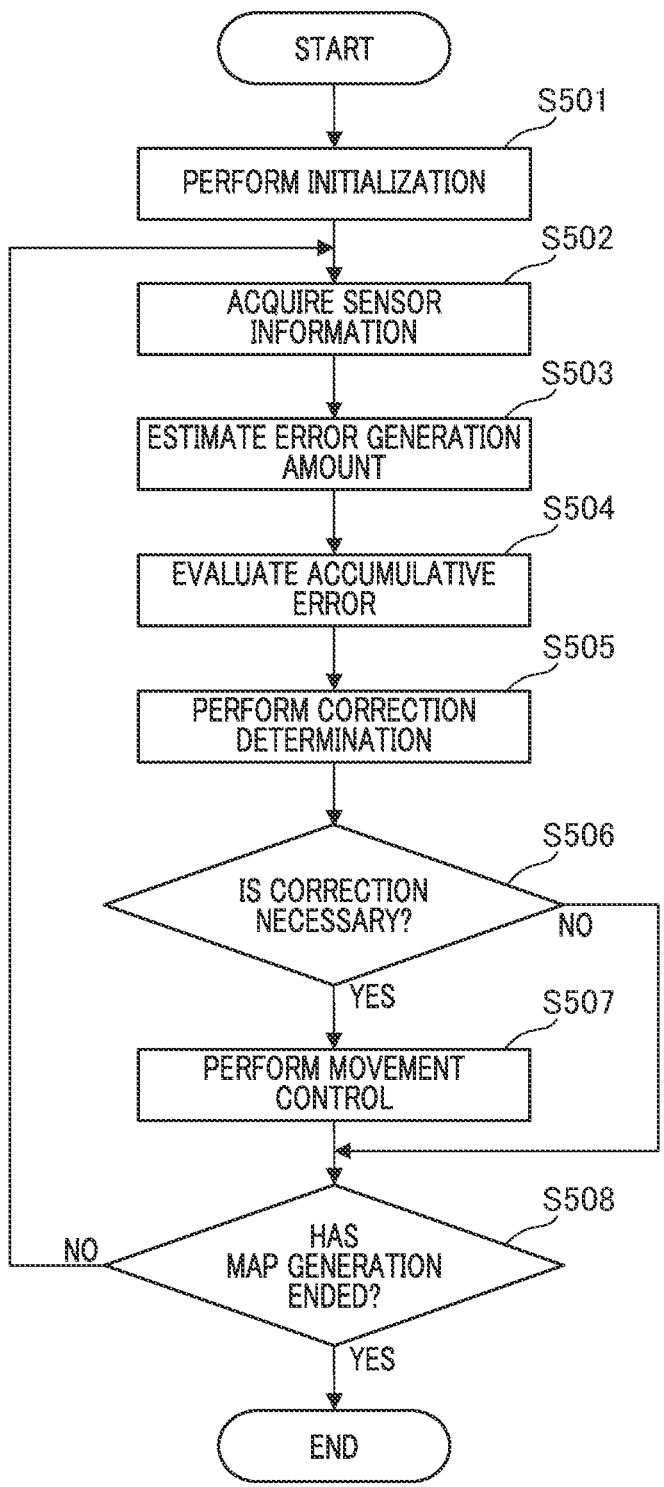
FIG. 5 is a flowchart illustrating a process according to the third embodiment.

FIG. 5 is a flowchart illustrating a flow of the entire process of this embodiment. Process details of S501 to S506 are similar to those of S301 to S306 illustrated in FIG. 3, and thus detailed description thereof will be omitted.

In S506, if it is determined that correction of map information is necessary, the process proceeds to a process of S507. In S507, the correction determining unit 104 notifies the control device 400 of a movement instruction for correcting the map information. The control device 400 that has received the movement instruction performs control of turning the automated guided vehicle 1 such that loop closure is automatically performed at the time of generating map information of visual SLAM or control of moving the automated guided vehicle 1 such that a movement path forms a closed loop. After S507, the process proceeds to a process of S508. On the other hand, if it is determined that correction of map information is not necessary in S506, the process proceeds to a process of S508.

In S508, a CPU 201 determines whether or not generation of map information has ended. If it is determined that generation of the map information has ended, a series of processes ends. On the other hand, if it is determined that generation of map information has not ended, the process proceeds to S502, and the process continues.

The control device 400 controls turning or movement of the automated guided vehicle 1 while maintaining points at which at least a common area is shown in parts of captured images, which are consecutive in time, relating to an image group acquired by consecutive image capture in the imaging device 10. Then, operation control of the automated guided vehicle 1 is performed such that an image capture direction of the imaging device 10 rotates by 360° from a start time point of turning or movement of the automated guided vehicle 1, and the automated guided vehicle returns to a position near the start position or in a direction that is the same as that of the start time point.

According to this embodiment, by determining a position and a timing relating to performing of correction using LC that is appropriate based on an evaluation of accumulative error and performing control of changing the position and the posture of the automated guided vehicle 1, the automated guided vehicle 1 can automatically performed image capture for generating map information. Thus, complication of an operation of generating map information with high accuracy can be reduced. Appropriate position and timing at which performing of correction using LC is necessary are determined on the basis of a result of an evaluation of a degree of accumulative error, and high-accuracy map information for which correction using LC is automatically performed without requiring efforts of a user can be generated.

Next, a modified example (a third modified example) of the third embodiment will be described.

Third Modified Example

In the third embodiment, although an example in which control of turning or movement of the automated guided vehicle 1 is performed has been described, in this modified example, the imaging device 10 that is the sensor 100 is rotated or moved as a control method for correcting using LC. One or both of a rotation mechanism unit or a movement mechanism unit of the imaging device 10 are provided, and the control device 400 performs control of rotation or movement of the imaging device 10.

In the embodiment described above, need for correction using LC is notified to a user on the basis of results of an evaluation of accumulative error and correction determination during image capture for generating map information, or the movement control described above, turning, or rotation control is performed. In accordance with this, complication of an operation of generating high-accuracy map information can be further reduced.

Finally, a modified example (a fourth modified example) of the first to third embodiments described above will be described.

Fourth Modified Example 1

In this modified example, in determination of need for correcting accumulative error, settings relating to map accuracy can be reflected. A process of selecting generation of high-accuracy map information or generation of low-accuracy map information is performed in advance by a user operation through the input unit 205. If generation of the high-accuracy map information is selected, the information processing device 200 adjusts a determination parameter of the correction determining unit 104 such that a frequency of performing of correction using LC becomes high. For example, a threshold used for determining need for accumulative error correction is set to a low value. On the other hand, if generation of the low-accuracy map information is selected, the information processing device 200 adjusts a determination parameter of the correction determining unit 104 such that a frequency of performing of correction using LC becomes low.

According to this modified example, selection relating to desired map accuracy is performed in accordance with a user operation, and image capture for generating map information can be performed.

Fourth Modified Example 2

In the embodiments described above, an embodiment in which the information processing device 200 is included in the automated guided vehicle 1 has been described. The information processing device 200 of this modified example is installed outside the automated guided vehicle 1 and acquires sensor information from the sensor 100 of the automated guided vehicle 1 through wireless communication or the like.

In this modified example, by using the information processing device 200 that is an external device of the automated guided vehicle 1, determination relating to accumulative error correction using LC and operation control of the automated guided vehicle 1 for LC can be performed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-180560, filed Nov. 4, 2021, which is hereby incorporated by reference wherein in its entirety.

What is claimed is:

1. An information processing device comprising:
at least one processor; and
at least one memory holding a program that makes the processor function to perform:
a first generation step of generating map elements based on position/posture information of an imaging device in the case where an image is captured, which is estimated from the image captured by the imaging device mounted on a vehicle, and three-dimensional position information of a feature point included in the image;
a second generation step of generating three-dimensional map information based on the plurality of map elements generated by the imaging device that capture images in a plurality of different positions/postures;
an estimation step of estimating an error in the position/posture information of the imaging device in a specific map element;
an output step of to outputting first information related to the re-arrival of the vehicle in the vicinity of a point where the vehicle has passed, if the estimated error exceeds a threshold;
a correction step of correcting position/posture information of the imaging device included in a map element corresponding to the vicinity of the point where the vehicle has passed, if the vehicle has moved based on the first information; and
a setting step of setting accuracy with which the three-dimensional map information is generated,
wherein if the accuracy is set high, the threshold is lower as compared to the case if the accuracy is set low.

2. The information processing device according to claim 1, wherein the estimation step estimates the error based on a rotation amount of a wheel from the start of movement of the vehicle.

3. The information processing device according to claim 1, wherein the estimation step estimates the error based on a movement distance of the moving body from the start of movement.

4. The information processing device according to claim 2, wherein the estimation step estimates the error based on a number of feature points in the specific map element and a map element generated before the specific map element.

5. The information processing device according to claim 1, wherein the estimation step estimates the error based on a distance between the position information of the imaging device and three-dimensional position information of the feature point in the specific map element.

6. The information processing device according to claim 1, wherein the output step outputs the first information by voice.

* * * * *